(12) United States Patent
Zheng et al.

(10) Patent No.: US 11,774,624 B2
(45) Date of Patent: Oct. 3, 2023

(54) METHOD FOR DISCOVERING UNEXPLODED ORDNANCE BY DETECTING TRANSIENT ELECTROMAGNETIC FIELD IN COMBINATION WITH MAGNETIC FIELD GRADIENT

(71) Applicants: TSINGHUA UNIVERSITY, Beijing (CN); BEIJING INSTITUTE OF SATELLITE ENVIRONMENTAL ENGINEERING, Beijing (CN)

(72) Inventors: Xiao-Ping Zheng, Beijing (CN); Zhen-Yuan Sun, Beijing (CN); Hua Geng, Beijing (CN); Xiao-Jiao Deng, Beijing (CN); Bin Wang, Beijing (CN)

(73) Assignees: TSINGHUA UNIVERSITY, Beijing (CN); BEIJING INSTITUTE OF SATELLITE ENVIRONMENTAL ENGINEERING, Beijing (CN)

( * ) Notice: Subject to any disclaimer, the term of this patent is extended or adjusted under 35 U.S.C. 154(b) by 473 days.

(21) Appl. No.: 17/000,238

(22) Filed: Aug. 21, 2020

(65) Prior Publication Data
US 2021/0141118 A1    May 13, 2021

(30) Foreign Application Priority Data
Aug. 23, 2019   (CN) .......................... 201910784075.6

(51) Int. Cl.
*G01V 3/38* (2006.01)
*G01V 3/12* (2006.01)
*F41H 11/136* (2011.01)

(52) U.S. Cl.
CPC ............. *G01V 3/38* (2013.01); *F41H 11/136* (2013.01); *G01V 3/12* (2013.01)

(58) Field of Classification Search
CPC ... G01V 3/38; G01V 3/12; G01V 3/10; G01V 3/081; G01V 3/08; F41H 11/136
See application file for complete search history.

(56) References Cited

U.S. PATENT DOCUMENTS 3,982,179 A  *  9/1976  Forster ................. G01R 33/022
                                                                    324/245
2002/0030192 A1    3/2002  Nikolaev et al.
(Continued)

FOREIGN PATENT DOCUMENTS

CN       103605164         2/2014
CN       103605164 A  *   2/2014
(Continued)

OTHER PUBLICATIONS

Zhang, Linlin, "Development of Engineering Transient Electromagnetic Detector", «Chinese Master's Theses Full-Tex Database Engineering Science and TechnologyII», No. 2, Feb. 15, 2017, pp. 7-9,17-19,35-38 and 46.
(Continued)

*Primary Examiner* — Catherine T. Rastovski
*Assistant Examiner* — Yossef Korang-Beheshti

(57) ABSTRACT

A method for discovering an unexploded ordnance in a target area includes: acquiring first feedback signals respectively corresponding to detection regions, the first feedback signals being first induced electromotive force signals; judging whether there is any abnormal signal in the first feedback signals, if there is the abnormal signal, determining the detection region corresponding to the abnormal signal is an abnormal region; acquiring second feedback signals respectively corresponding to detection sites in the abnormal region, the second feedback signals being magnetic field gradient signals; acquiring third feedback signals respectively corresponding to the detection sites, the third feedback signals being second induced electromotive force sig-
(Continued)

nals; acquiring location information of the detection sites; obtaining a feature spatial distribution map of the abnormal region; and judging whether there is any unexploded ordnance in the abnormal region according to the feature spatial distribution map.

14 Claims, 5 Drawing Sheets

(56) References Cited

U.S. PATENT DOCUMENTS

| | | | |
|---|---|---|---|
| 2009/0006009 A1* | 1/2009 | Czipott | G01R 33/022 702/57 |
| 2012/0239191 A1* | 9/2012 | Versteeg | F41H 11/13 901/1 |
| 2016/0084659 A1* | 3/2016 | Yang | G01C 21/206 702/150 |
| 2016/0131789 A1 | 5/2016 | Bosnar | |
| 2017/0097439 A1* | 4/2017 | Barrowes | G01V 3/165 |

FOREIGN PATENT DOCUMENTS

| | | |
|---|---|---|
| CN | 105181791 | 12/2015 |
| CN | 105353428 | 2/2016 |
| CN | 105759316 | 7/2016 |
| CN | 106772632 | 5/2017 |
| CN | 107367764 | 11/2017 |
| CN | 108287367 | 7/2018 |
| CN | 108802851 | 11/2018 |
| CN | 109270579 | 1/2019 |
| CN | 109358367 | 2/2019 |
| CN | 109507736 | 3/2019 |

OTHER PUBLICATIONS

Les P. Beard et al. "Filed tests of an experimental helicopter time-domain electromagnetic system for unexploded ordnance detection", «Geophysics», Feb. 6, 2004, pp. 664-673.

Zhi-peng Qi et al. "Drone-borne transient electromagnetic system and its application in UXO detection" «SEG International Exposition and 88th Annual Meeting», Dec. 31, 2018, p. 2776.

Huang, Lijun, et al. "The application of grounded source transient electromagnetic method to the oil filed" «Geophysical & Geochiemical Exploration»vol. 29 No. 4, Aug. 31, 2005, p. 316.

Xue, Guoqiang, et al. "Short-offset TEM technique with a grounded wire source for deep sounding" «Chinese Journal of Geophysics», vol. 56, Jan. 31, 2013, pp. 256-257.

Sun, Jiajia et al. "Multidomain petrophysically constrained inversion and geology differentiation using guided fuzzy c-means clustering" «Geophysics», vol. 80, No. 4, Jul.-Aug. 2015, pp. ID1-ID18.

Li, Yaoguo et al. "3-D inversion of magnetic data" «Geophysics», vol. 61, No. 2, Mar.-Apr. 1996, pp. 394-408.

Guan, Zhining et al. "Inversion of Gravity and Magnetic Anomalies Using Pseudo-BP Neural Network Method and Its Application" «Acta Geophysica Sinica», vol. 41, No. 2, Mar. 1998, pp. 243-251.

P. Shamsipour et al. "3D stochastic inversion of magnetic data" «Journal of Applied Geophysics» 73(2011), pp. 336-347.

Geng, Meixia et al. "3D inversion of potential field data using a marginalizing probabilistic method" «Geophysics», vol. 83, No. 5, Sept.-Oct. 2018, pp. G93-G106.

Li, Xiaokang et al. "Overview on unexploded ordnance problem and a solution: The geophysical scheme" «China Mining Magazine», vol. 19, Dec. 31, 2010, part 2.

Zhao, Gaishan. "genetic algorithm for solving nonlinear optimization problem" «Progress in Geophysics» vol. 7, No. 1, Feb. 1992, pp. 90-97.

* cited by examiner

METHOD FOR DISCOVERING UNEXPLODED ORDNANCE BY DETECTING TRANSIENT ELECTROMAGNETIC FIELD IN COMBINATION WITH MAGNETIC FIELD GRADIENT

CROSS-REFERENCE TO RELATED APPLICATION

This application claims all benefits accruing under 35 U.S.C. § 119 from China Patent Application No. 201910784075.6 filed on Aug. 23, 2019 in the China National Intellectual Property Administration, the content of which is incorporated by reference herein. This application is related to a commonly-assigned application, entitled "TRANSIENT ELECTROMAGNETIC FIELD DETECTION APPARATUS HAVING DYNAMIC EMISSION SOURCE IN COMBINATION WITH STATIC EMISSION SOURCE AND TRANSIENT ELECTROMAGNETIC FIELD DETECTION METHOD FOR DISCOVERING UNEXPLODED ORDNANCE" (U.S. patent application Ser. No. 17/000,263), the content of which is also hereby incorporated by reference.

FIELD

The present disclosure relates to the field of detection technology, in particular to a method for discovering an unexploded ordnance by detecting transient electromagnetic field in combination with magnetic field gradient.

BACKGROUND

Since the end of the Second World War, huge amount of unexploded ordnances are still present in many countries, which pose a grave threat to human lives and health, as well as environmental concern. For example, unexploded chemical weapons may be triggered and leak highly toxic chemicals. So, it would be of great importance to develop techniques to discover the unexploded ordnances.

SUMMARY

A method for discovering an unexploded ordnance in a target area includes: partitioning the target area into a plurality of detection regions; acquiring a plurality of first feedback signals respectively corresponding to the plurality of detection regions, the first feedback signals being first induced electromotive force signals; judging whether there is any abnormal signal in the first feedback signals, and if there is the abnormal signal, determining the detection region corresponding to the abnormal signal is an abnormal region; arranging a plurality of detection sites in the abnormal region; acquiring second feedback signals respectively corresponding to the plurality of detection sites, the second feedback signals being magnetic field gradient signals; acquiring third feedback signals respectively corresponding to the plurality of detection sites, the third feedback signals being second induced electromotive force signals; acquiring location information of the plurality of detection sites; obtaining a feature spatial distribution map of the abnormal region according to the second feedback signals, the third feedback signals, and the location information; and judging whether there is any unexploded ordnance in the abnormal region according to the feature spatial distribution map.

In the method provided by the present disclosure, the target area is roughly detected to find out the abnormal region therein, and then the abnormal region is finely detected to explore the unexploded ordnance. For the regions with great difference in electrical conductivity, the induced electromotive force signals can more accurately reflect the electrical conductivity distribution of the regions, so that the abnormal region can be more efficiently located. For the specific abnormal region with a great magnetic conductivity, the magnetic field gradient signals can more accurately reflect the magnetic conductivity distribution of the region. Accordingly, the method combining the rough detection and the fine detection is not only efficient but also accurate. Moreover, the induced electromotive force signals and the magnetic field gradient signals of the abnormal region are combined to obtain the feature spatial distribution map of the abnormal region. As a result, the obtained feature spatial distribution map of the abnormal region can more accurately reflect the real situation of the abnormal region, thereby further increasing the detection accuracy.

DETAILED DESCRIPTION

For a clear understanding of the technical features, objects and effects of the present disclosure, specific embodiments of the present disclosure will now be described in detail with reference to the accompanying drawings. It is to be understood that the following description is merely exemplary embodiment of the present disclosure, and is not intended to limit the scope of the present disclosure.

Use of ordinal terms such as "first", "second", "third", etc., to modify an element does not by itself connote any priority, precedence, or order of one element over another or the temporal order in which acts of a method are performed. Rather, unless specifically stated otherwise, such ordinal terms are used merely as labels to distinguish one element having a certain name from another element having a same name (but for use of the ordinal term). For example, a "first feedback signal" may be so named merely to distinguish it from, e.g., a "second feedback signal". The mere usage of the ordinal numbers "first" and "second" before the term "feedback signal" does not indicate any other relationship between the two feedback signals, and likewise does not indicate any other characteristics of either or both feedback signals.

Presently, a magnetism detection method is one of the most commonly used methods for determining whether there is any unexploded ordnance in a target area. However, the conventional magnetism detection method for discovering the unexploded ordnance is time-consuming and low in accuracy.

Figure 1:
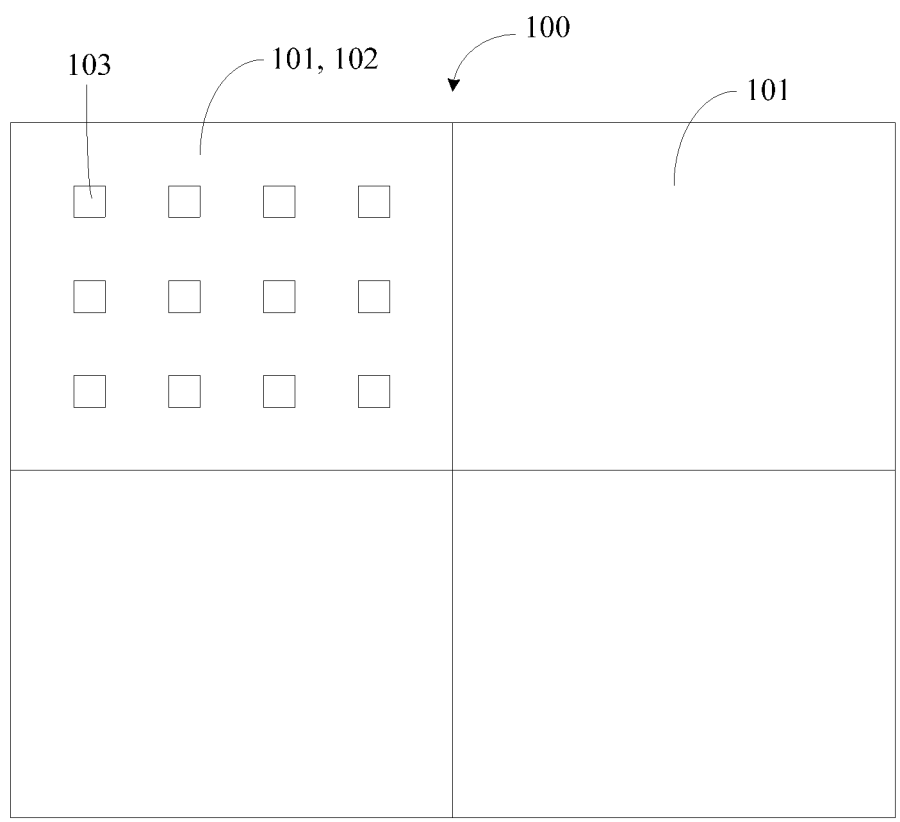
FIG. 1 is a schematic view of an embodiment of a target area partitioned into a plurality of detection regions.
Figure 2:
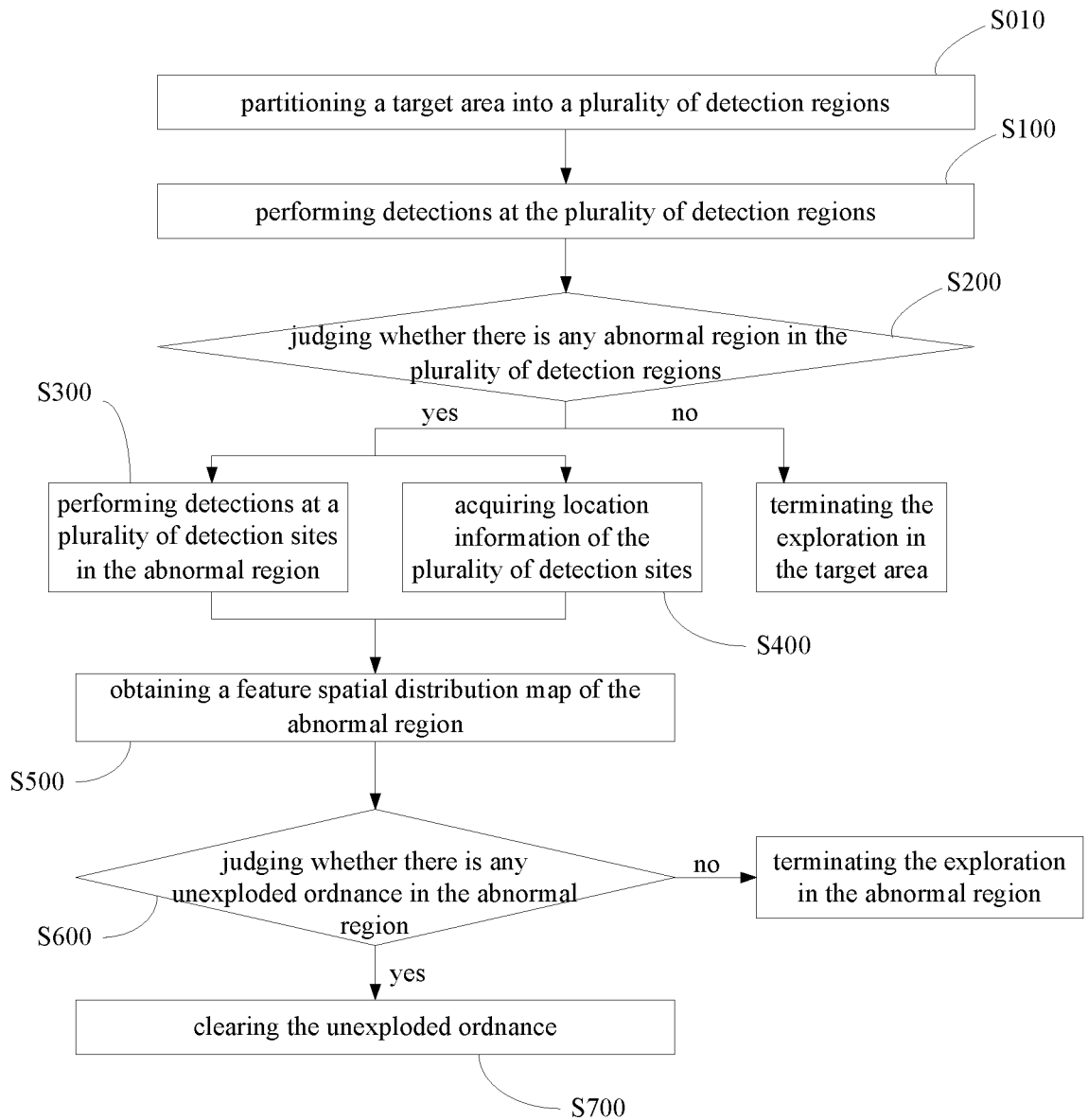
FIG. 2 is a flowchart of a method for discovering an unexploded ordnance in the target area according to an embodiment of the present disclosure.

In view of this, the present disclosure provides an embodiment of a method for discovering an unexploded ordnance in a target area 100 by detecting transient electromagnetic field in combination with magnetic field gradient. Referring to FIGS. 1 to 2, the embodiment of the method includes:

S010, partitioning the target area 100 into a plurality of detection regions 101;

S100, acquiring a plurality of first feedback signals respectively corresponding to the plurality of detection regions 101 of the target area 100, the first feedback signals being first induced electromotive force signals;

S200, judging whether there is any abnormal signal in the first feedback signals, and if there is the abnormal signal, determining the detection region 101 corresponding to the abnormal signal as an abnormal region 102 and then proceeding to S300, and if there is no abnormal signal, terminating the exploration of the target area 100;

S300, arranging a plurality of detection sites 103 in the abnormal region 102; acquiring second feedback signals respectively corresponding to the plurality of detection sites 103, the second feedback signals being magnetic field gradient signals; and acquiring third feedback signals respectively corresponding to the plurality of detection sites 103, the third feedback signals being second induced electromotive force signals;

S400, acquiring location information of the plurality of detection sites 103;

S500, obtaining a feature spatial distribution map of the abnormal region according to the second feedback signals, the third feedback signals, and the location information; and S600, judging whether there is any unexploded ordnance in the abnormal region 102 according to the feature spatial distribution map.

In the embodiment of the method provided by the present disclosure, the target area 100 is roughly detected to find out the abnormal region 102 therein, and then the abnormal region 102 is finely detected to explore the unexploded ordnance. For the regions with great difference in electrical conductivity, the first induced electromotive force signals can more accurately reflect the electrical conductivity distribution of the regions, thereby more efficiently finding the abnormal region. For the specific abnormal region with a great magnetic conductivity, the magnetic field gradient signals can more accurately reflect the magnetic conductivity distribution of the region. Accordingly, the method combining the rough detection and the fine detection is not only efficient but also accurate.

Moreover, the second induced electromotive force signals and the magnetic field gradient signals of the abnormal region are combined to obtain the feature spatial distribution map of the abnormal region 102. As a result, the obtained feature spatial distribution map can more accurately reflect the real situation of the abnormal region 102, thereby further increasing the detection accuracy.

In the method, a primary magnetic field, which can be generated by a transmitting coil carrying a changing electric current, pervades the target area and induces an eddy current in an electrical conducting object, such as an unexploded ordnance, in the target area. The eddy current induces a secondary magnetic field. The secondary magnetic field is detected by a receiving coil which has an induced voltage changed with the secondary magnetic field. The induced voltage of the receiving coil, i.e., the induced electromotive force, is measured to obtain the induced electromotive force signal. When the primary magnetic field suddenly disappears, the eddy current and the secondary magnetic field will not immediately disappear but decay in a period of time. Correspondingly, the induced electromotive force signal will have a decay curve. The characteristics of the decay curve of the induced electromotive force signal representing the secondary magnetic field can reflect the size, depth, and electrical property of the electrical conducting object.

In an embodiment, in S010, the target area 100 can be partitioned with grid lines to form the plurality of detection regions 101. The plurality of detection regions 101 can have a substantially same size and a substantially same shape. The detection regions 101 can be rectangular detection regions. This partition manner can simplify the calculation and increase the efficiency of the detection.

Figure 3:
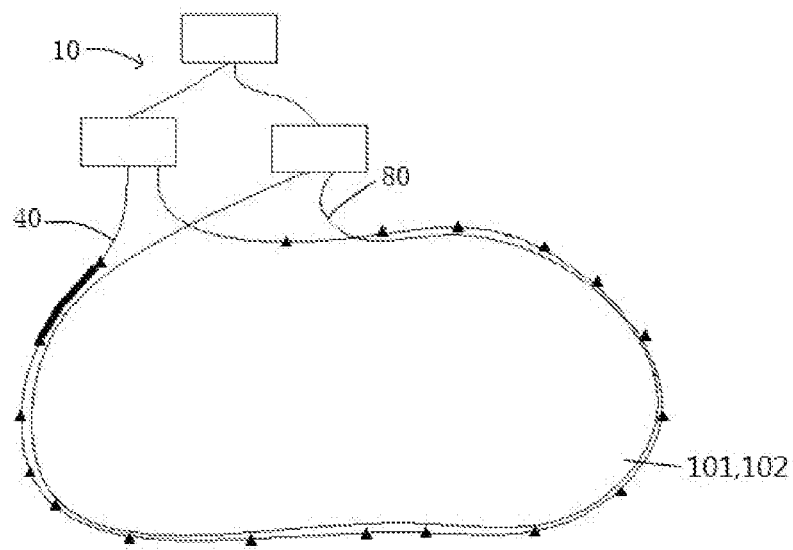
FIG. 3 is a schematic view of an embodiment of utilizing a first transient electromagnetometer to perform detection at a detection region.

Referring to FIG. 3, in an embodiment, in S100, the first feedback signals can be acquired by utilizing a first transient electromagnetometer 10 to respectively perform detections at the plurality of detection regions 101. The first transient electromagnetometer 10 can include a first transmitting coil 40 and a first receiving coil 80. In the detection, the first transmitting coil 40 and the first receiving coil 80 both can be placed to surround the detection regions 101 one after another to acquire the plurality of first feedback signals. The plurality of first feedback signals correspond to the plurality of detection regions 101 in a one-to-one manner. The first transmitting coil 40 and the first receiving coil 80 both can be placed at a boundary of the detection region 101. The first transmitting coil 40 is configured to transmit a first detecting signal, which can be a changing magnetic field, to the detection region 101. The first receiving coil 80 is configured to acquire the first feedback signal, which can reflect the secondary magnetic field generated from the detection region 101 in response to the first detecting signal.

In an embodiment, the target area 100 can be partitioned such that each detection region 101 has a substantially same shape and a substantially same size as the area surrounded by the first transmitting coil and/or the first receiving coil.

In an embodiment, the first transmitting coil 40 and the first receiving coil 80 both are capable of surrounding an area with a rectangular shape of 5 m×2 m or 10 m×1 m. The target area 100 can be partitioned into a plurality of rectangular detection regions of 5 m×2 m or 10 m×1 m.

In an embodiment, in S100, the step of acquiring the first feedback signals respectively corresponding to the plurality of detection regions 101 of the target area 100 can include: respectively acquiring a plurality of first feedback sub-signals at different first time points corresponding to each detection region 101; and recording the first time points. That is, each first feedback signal includes the first feedback sub-signals corresponding to the same detection region 101 at different time points. That is, the first feedback signal is a transient signal or a time domain signal. The first feedback sub-signals can be first induced electromotive forces detected by the first receiving coil.

Since an anomaly, such as an unexploded ordnance, has an electrical conductivity different from that of the geologic body, such as earth or water, whether there is any anomaly below each detection region 101 can be judged via the first feedback signal.

In an embodiment, in S200, the step of judging whether there is any abnormal signal in the first feedback signals can include: comparing each first feedback signal with a reference signal, and determining the first feedback signal as the abnormal signal if at least a part of the first feedback signal in a time section is larger than corresponding part of the reference signal in the same time section.

A first curve is plotted according to the first feedback sub-signals and the first time points to represent the first feedback signal decaying with time (i.e., the induced electromotive force of the receiving coil changing with time). The reference signal is a third induced electromotive force signal corresponding to a region having no anomaly. A reference curve representing the reference signal decaying with time is adopted to reflect the region having no anomaly (i.e., a normal region). The reference curve can be an experience curve, and generally has a relatively smooth decaying trend since the geologic body in the normal region has substantially same electrical conductivity. Normally, in the first curves of the first feedback signals corresponding to the plurality of detection regions, most of the first curves have relatively smooth decaying trend as most of the detection regions are normal regions. Therefore, the reference curve can also be the first curve having a relatively smooth decaying trend.

Figure 5:
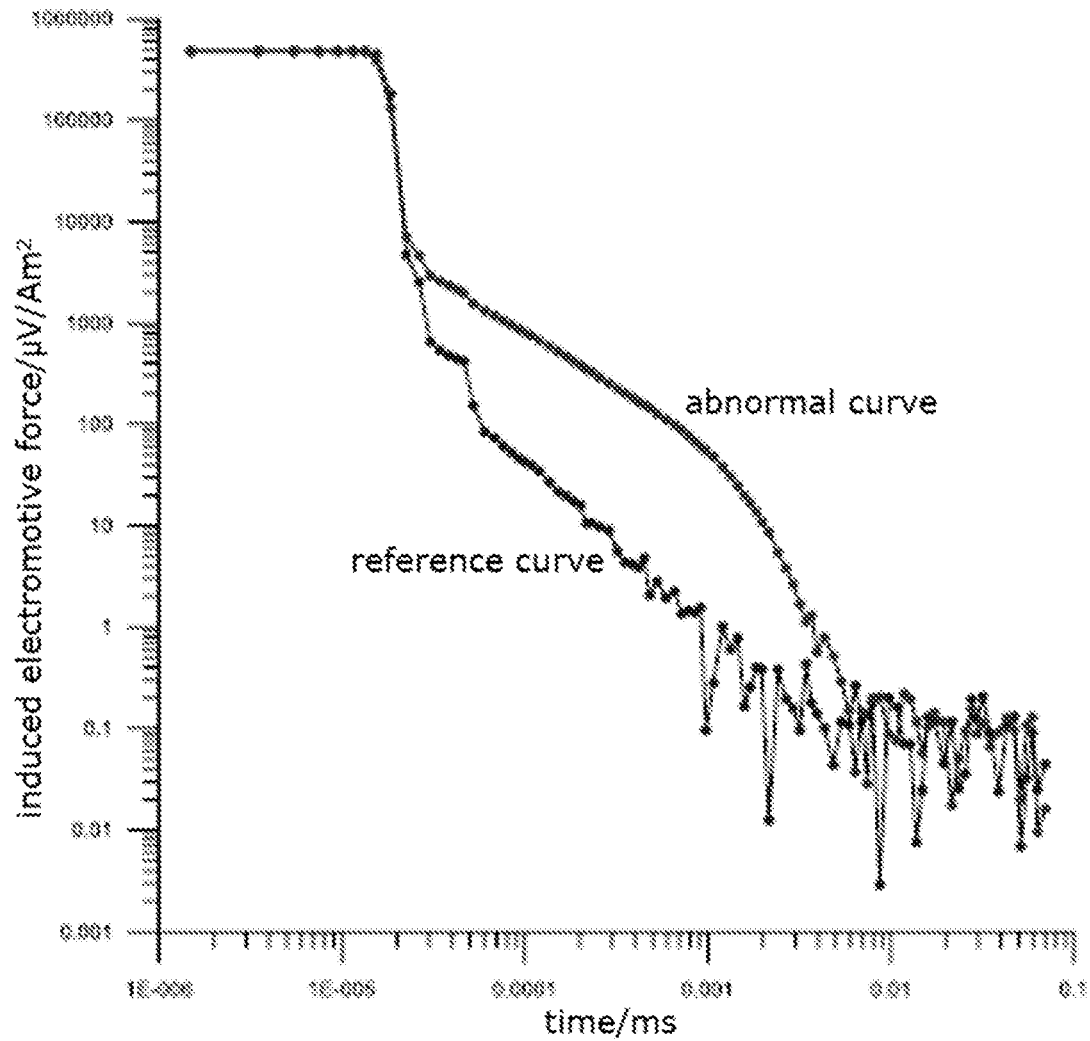
FIG. 5 shows curves of induced electromotive forces changed with time corresponding to abnormal and normal regions according to an embodiment of the present disclosure.

FIG. 5 shows two exemplary curves of induced electromotive forces changing with time, wherein the abnormal curve is plotted according to a first feedback signal corresponding to an abnormal region where an unexploded ordnance simulator is buried, while the reference curve is plotted according to a first feedback signal corresponding to a normal region without the unexploded ordnance simulator. The induced electromotive force in the FIG. 3 has been normalized by dividing the measured voltage by a product of an electrical current fed to the first transmitting coil 40 and an area of the detection region 101. It can be seen that at some first time points, the induced electromotive forces of the abnormal curve is higher than the induced electromotive forces of the reference curve. This is because the unexploded ordnance simulator has a metal shell having a larger electric conductivity than that of the geologic body.

In S300, the plurality of detection sites 103 can be uniformly distributed in the abnormal region 102. In an embodiment, the plurality of detection sites 103 can be arranged in a two dimensional array in the abnormal region 102. The plurality of detection sites 103 can be arranged in rows and columns in the abnormal region 102.

In an embodiment, the abnormal region 102 is partitioned with grid lines to form a plurality of sub-regions. Each detection site can be located at an intersection of two intersectant grid lines. For example, the plurality of sub-regions can be rectangular and have a substantially same size. The detection site can be located at an intersection of two orthogonal grid lines.

In an embodiment, the second feedback signals can be respectively acquired by utilizing a magnetic field gradiometer to perform detections at the plurality of detection sites 103. The second feedback signals correspond to the detection sites 103 in a one-to-one manner. The magnetic field gradiometer can scan the plurality of detection sites 103 one after another to acquire the second feedback signals.

Figure 4:
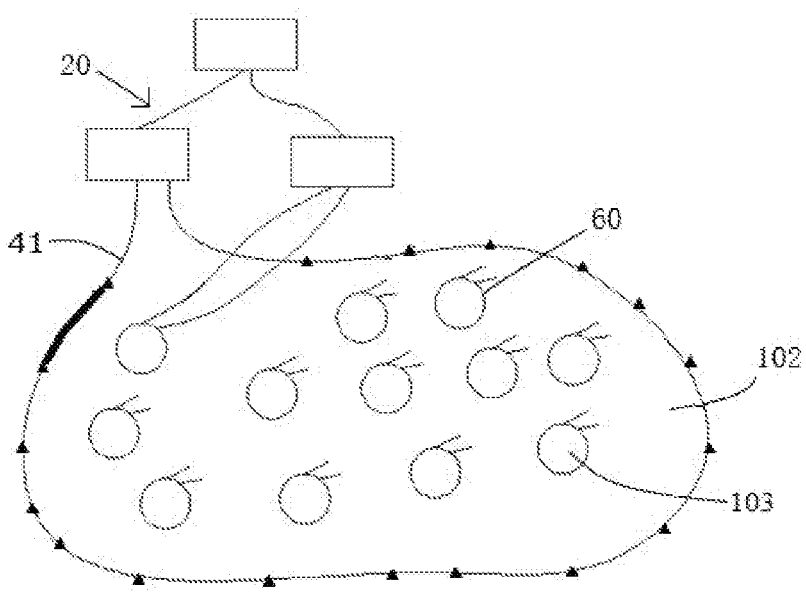
FIG. 4 is a schematic view of an embodiment of utilizing a second transient electromagnetometer to respectively and simultaneously perform detections at a plurality of detection sites.

Referring to FIG. 4, in an embodiment, the third feedback signals can be acquired by utilizing a second transient electromagnetometer 20 to perform detections at the plurality of detection sites 103 respectively and simultaneously. The third feedback signals correspond to the detection sites 103 in a one-to-one manner. The second transient electromagnetometer 20 can include a second transmitting coil 41 and a plurality of second receiving coils 60. In the detection, the second transmitting coil 41 can be placed to surround the abnormal region 102 (for example, placed at the boundary of the abnormal detection 102 to surround the abnormal region 102), while the plurality of second receiving coils 60 can be placed to respectively surround the detection sites 103 in a one-to-one manner. The second transmitting coil 60 is configured to transmit a third detecting signal, which can be a changing magnetic field, to the abnormal region 102. The second receiving coils 60 are configured to acquire the third feedback signals at the corresponding detection sites 103.

Alternatively, the second transient electromagnetometer 20 can include only one second receiving coil 60. The detections can be performed at the plurality of detection sites 103 respectively and separately to acquire the third feedback signals.

In an embodiment, in S300, the step of acquiring third feedback signals respectively corresponding to the plurality of detection sites 103 can include: respectively acquiring a plurality of third feedback sub-signals at different third time points corresponding to each detection site 103; and recording the third time points. That is, each third feedback signal includes the plurality of third feedback sub-signals acquired at the same detection site and at different time points. That is, the third feedback signal is a transient signal or a time domain signal. The third feedback sub-signals can be second induced electromotive forces detected by the second receiving coil.

In an embodiment, S400 can include:

S410, selecting one detection site 103 from the plurality of detection sites 103 as a reference site;

S420, acquiring a reference geographic coordinate of the reference site; and

S430, acquiring geographic coordinates of other detection sites according to the reference geographic coordinate and the arrangement of the plurality of detection sites in the abnormal region.

The reference coordinate of the reference site can be measured by a locating device, such as a real-time kinematic locating device, for example, a differential locating device.

The feature spatial distribution map in S500 is a spatial distribution map of a specific feature of the abnormal region, such as magnetic conductivity, apparent resistivity, or a fusing result of the magnetic conductivity and the apparent resistivity of the abnormal region. In an embodiment, the S500 can include:

S510, obtaining a magnetic conductivity spatial distribution map of the abnormal region 102 by parametric inversion according to the second feedback signals and the location information;

S520, obtaining an apparent resistivity spatial distribution map of the abnormal region 102 by parametric inversion according to the third feedback signals and the location information; and S530, fusing the magnetic conductivity spatial distribution map and the apparent resistivity spatial distribution map to form the feature spatial distribution map of the abnormal region 102.

In the method provided in the present disclosure, by detecting the transient electromagnetic field in combination with the magnetic field gradient and obtaining the feature spatial distribution map fusing two features together, the accuracy of the exploration of the unexploded ordnance is increased, and the false alarm rate of the exploration of the unexploded ordnance is decreased, thereby avoiding unnecessary excavation and increasing the efficiency of the exploration of the unexploded ordnance.

In an embodiment, in S510, the magnetic conductivity of the local area of the abnormal region 102 below each detection site 103 can be calculated from the corresponding second feedback signal by parametric inversion. The magnetic conductivity spatial distribution map of the abnormal region 102 is constituted by the magnetic conductivities of the local areas of the abnormal region 102 below all detection sites 103 and the corresponding location information of the detection sites 103.

In an embodiment, S520 can include:

S521, respectively calculating third feedback depths corresponding to the third feedback sub-signals on the basis of the third feedback time points at each detection site; the former third feedback sub-signal corresponds to a shallower location below the detection site 103, and the latter third feedback sub-signal corresponds to a deeper location below the detection site 103;

S522, respectively calculating apparent resistivity values of the local area below each detection site at the third feedback depths according to the third feedback sub-signals by parametric inversion;

S523, obtaining apparent resistivity distribution in depth below each detection site 103 according to the apparent resistivity values and the third feedback depths; and S524, obtaining the apparent resistivity spatial distribution map of the abnormal region 102 according to the apparent resistivity distribution in depth below each detection site 103 and the location information of the plurality of detection sites 103.

The parametric inversion is a technique for inverting a parameter, such as a magnetic susceptibility, a magnetization intensity, an apparent resistivity, or a magnetic conductivity, of an area below a detection region. An iterative algorithm is one of the most commonly used algorithms used in the inversion. When using the iterative algorithm, a parametric model indicating a functional relation of the parameter with detected data is established, and then a value of the parameter is put into the parametric model and iteratively adjusted until a difference between a theory value calculated by the parametric model and the detected data is within a threshold value. The finally adjusted value of the parameter is the inverted value of the parameter.

In an embodiment, in the parametric inversion of the magnetic conductivity spatial distribution map of the abnormal region 102, the area below each detection site 103 is partitioned into a plurality of uniform cuboids. A parametric model indicating a functional relation between the magnetic field gradient at each detection site 103 and the magnetic conductivities of the cuboids below each detection site 103 is established. The values of the magnetic conductivities of the cuboids below each detection site 103 can be iteratively adjusted with the parametric model until the difference between the calculated value and the detected value of the magnetic field gradient at each detection site 103 is within a threshold value. The magnetic conductivity spatial distribution map of the abnormal region 102 can be obtained according to the finally adjusted values of the magnetic conductivities of the cuboids below each detection site and the arrangement of the detection sites.

The iteration technique used for the parametric inversion can include the least square method, steepest descent method, damped least square method, fuzzy c-means clustering method (see Sun J and Li Y., Multidomain petrophysically constrained inversion and geology differentiation using guided fuzzy c-means clustering, J. Geophysics, 2015, 80(4):ID1-ID18), regularization method (Li Y, Oldenburg D W. 3-D inversion of magnetic data, J. Geophysics, 1996, 61(2):394-408), genetic algorithm (Gaishan Zhao, genetic algorithm for solving nonlinear optimization problem, J. Progress in Geophysics, 1992, 7(1):90-97), pseudo-BP neural network method (Zhining Guan. et. al., Inversion of gravity and magnetic anomalies using pseudo-BP neural network method and its application, J. ACTA GEOPHYSICA SINICA, 1998, 41(2):242-251), Cokriging method (Shamsipour P et al., 3D stochastic inversion of magnetic data, Journal of applied geophysics, 2011, 73(4): 336-347), and marginalizing probabilistic method (Meixia G et al., 3-D inversion of potential field data using a marginalizing probabilistic method, J. Geophysics, 2018:1-61). The entire contents of the above listed literatures are hereby incorporated by reference.

In addition, a location and a shape of an anomaly below the detection site can also be obtained by the inversion technique.

In an embodiment, S530 can include:

S531, performing normalization processing on the apparent resistivity spatial distribution map to obtain a first grey scale map;

S532, performing normalization processing on the magnetic conductivity spatial distribution map to obtain a second grey scale map; and S533, fusing the first grey scale map and the second grey scale map by performing weighted averaging for gray levels of respective corresponding pixels of the first and second grey scale maps, thereby forming the feature spatial distribution map.

In an embodiment, in S531, the apparent resistivity spatial distribution map is normalized to 8 gray levels to obtain the first grey scale map. In S532, the magnetic conductivity spatial distribution map is normalized to 8 gray levels to obtain the second grey scale map.

In S533, assuming that a gray level at a coordinate P1 (x1, y1, z1) in the first grey scale map is $A_{(x1, y1, z1)}$ and a gray level at a corresponding coordinate P2 (x1, y1, z1) in the second grey scale map is $B_{(x1, y1, z1)}$, a gray level at a corresponding coordinate P (x1, y1, z1) in the fused feature spatial distribution map is:

$$F_{(x1,y1,z1)} = k1 \times A_{(x1,y1,z1)} + k2 \times B_{(x1,y1,z1)},$$

wherein k1+k2=1, 0≤k1≤1, and 0≤k2≤1. k1 and k2 can be selected according to a first ratio of signal to noise of the first grey scale map and a second ratio of signal to noise of the second grey scale map. A ratio of k1 to k2 can be proportional to a ratio of the first ratio to the second ratio. If the first ratio is larger than the second ratio, it is suggested that the difference in apparent resistivity in the abnormal region is more significant than the difference in magnetic conductivity in the abnormal region (vice versa). In this case, the fused feature spatial distribution map can be obtained by setting k1 to be larger than k2 to reflect the real situation of the abnormal region more accurately.

In an embodiment, after S600, the method can further include:

S700, clearing the unexploded ordnance (for example, excavating the unexploded ordnance out) if it is judged that there is the unexploded ordnance in the abnormal region 102; and terminating the exploration in this abnormal region 102 if it is judged that there is no unexploded ordnance in the abnormal region 102.

In some embodiment, two or more detection regions 101 may be determined as abnormal regions 102 in the target area. S300 to S700 can be repeatedly performed for each abnormal region 102.

In an exemplary embodiment, the target area 100 has an area of 10 m×10 m. The first receiving coil of a first transient electromagnetometer has an area of 10 m×1 m. The target area 100 is partitioned into ten detection regions in total. Each of the detection regions has a shape and a size substantially the same as those of the first receiving coil. Two unexploded ordnance simulators each having a steel cylindrical shell with a diameter of 10 cm and a length of 40 cm are buried in two detection regions respectively. The first transient electromagnetometer is utilized to detect the ten detection regions one after another and found two abnormal regions. The magnetic field gradiometer is utilized to scan a plurality of detection sites (spaced at an interval of 10 cm) in sequence with a frequency of 1 Hz in each abnormal region. The second transient electromagnetometer is further utilized to perform detections at the plurality of detection sites respectively.

Figure 6:
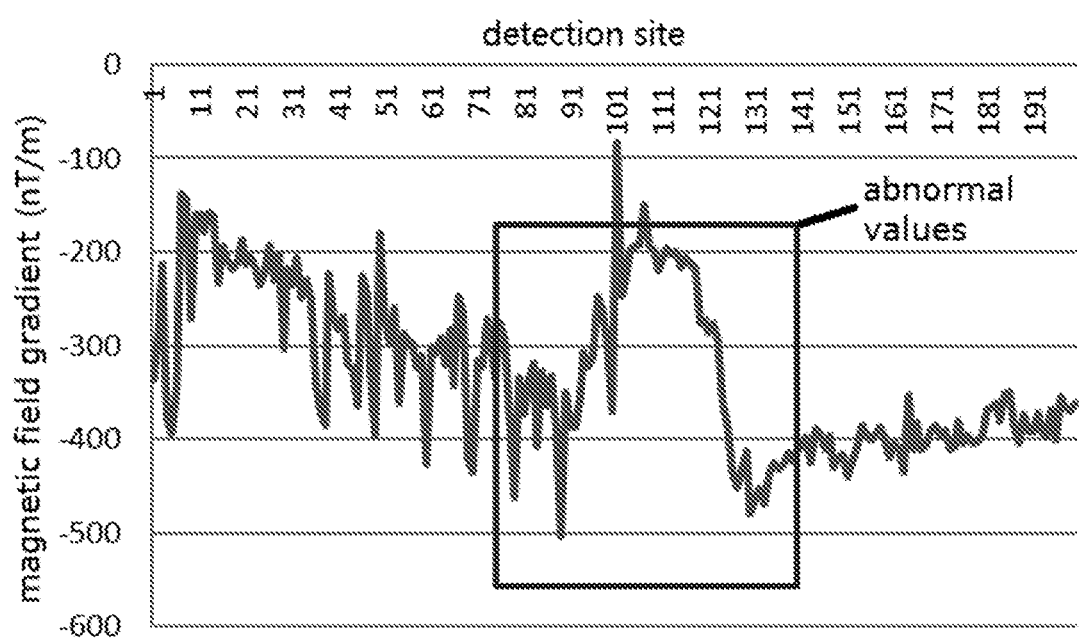
FIG. 6 shows magnetic field gradients acquired at a plurality of detection sites in the abnormal region according to an embodiment of the present disclosure.

FIG. 6 shows a response curve when detecting the abnormal region with the magnetic field gradiometer. It can be seen that the magnetic field gradient differences acquired at some detection sites are significantly larger than those acquired at other detection sites, suggesting the presence of the unexploded ordnance at these detection sites.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for discovering an unexploded ordnance in a target area, the method comprising:
    partitioning the target area into a plurality of detection regions;
    placing a first transmitting coil and a first receiving coil of a first transient electromagnetometer to surround the plurality of detection regions one after another, and acquiring a plurality of first feedback signals respectively corresponding to the plurality of detection regions by the first transient electromagnetometer, the first feedback signals being first induced electromotive force signals;
    judging whether there is an abnormal signal in the first feedback signals, and when there is the abnormal signal, determining the detection region corresponding to the abnormal signal is an abnormal region;
    arranging a plurality of detection sites in the abnormal region;
    scanning the plurality of detection sites one after another by a magnetic field gradiometer to acquire second feedback signals respectively corresponding to the plurality of detection sites, the second feedback signals being magnetic field gradient signals;
    placing a second transmitting coil of a second transient electromagnetometer to surround the abnormal region, placing a plurality of second receiving coils of the second transient electromagnetometer to respectively surround the plurality of detection sites, and acquiring third feedback signals respectively corresponding to the plurality of detection sites by the second transient electromagnetometer, the third feedback signals being second induced electromotive force signals;
    acquiring location information of the plurality of detection sites;
    obtaining a feature spatial distribution map of the abnormal region according to the second feedback signals, the third feedback signals, and the location information; and
    judging whether there is any unexploded ordnance in the abnormal region according to the feature spatial distribution map;
    wherein the obtaining the feature spatial distribution map of the abnormal region comprises:
    obtaining a magnetic conductivity spatial distribution map of the abnormal region by parametric inversion according to the second feedback signals and the location information;
    obtaining an apparent resistivity spatial distribution map of the abnormal region by parametric inversion according to the third feedback signals and the location information; and
    fusing the magnetic conductivity spatial distribution map and the apparent resistivity spatial distribution map to form the feature spatial distribution map of the abnormal region.

2. The method of claim 1, wherein the fusing the magnetic conductivity spatial distribution map and the apparent resistivity spatial distribution map to form the feature spatial distribution map of the abnormal region comprises:
    performing normalization processing on the apparent resistivity spatial distribution map to obtain a first grey scale map;
    performing normalization processing on the magnetic conductivity spatial distribution map to obtain a second grey scale map; and
    fusing the first grey scale map and the second grey scale map to form the feature spatial distribution map by performing weighted averaging for grey levels of respective corresponding pixels of the first and second grey scale maps.

3. The method of claim 2, wherein the apparent resistivity spatial distribution map is normalized to 8 gray levels to obtain the first grey scale map, and the magnetic conductivity spatial distribution map is normalized to 8 gray levels to obtain the second grey scale map.

4. The method of claim 1, wherein the acquiring a plurality of first feedback signals respectively corresponding to the plurality of detection regions comprises:
    respectively acquiring a plurality of first feedback sub-signals at a plurality of first time points corresponding to each detection region; and recoding the plurality of first time points.

5. The method of claim 4, wherein the judging whether there is any abnormal signal in the first feedback signals comprises:
    comparing each first feedback signal with a reference signal, and determining the first feedback signal as the abnormal signal when at least a part of the first feedback signal is larger than corresponding part of the reference signal.

6. The method of claim 5, wherein the reference signal is a third induced electromotive force signal corresponding to a region having no anomaly.

7. The method of claim 1, wherein the acquiring the plurality of third feedback signals respectively corresponding to the plurality of detection sites comprises:
    respectively acquiring a plurality of third feedback sub-signals at a plurality of third time points corresponding to each detection site; and recording the plurality of third time points.

8. The method of claim 7, wherein the obtaining the apparent resistivity spatial distribution map of the abnormal region by parametric inversion comprises:

respectively calculating third feedback depths corresponding to the third feedback sub-signals on the basis of the third feedback time points at each detection site;

respectively calculating apparent resistivity values of local area below the each detection site at the third feedback depths according to the third feedback sub-signals;

obtaining apparent resistivity distribution in depth below each detection site according to the apparent resistivity values and the third feedback depths; and obtaining the apparent resistivity spatial distribution map of the abnormal region according to the apparent resistivity distribution in depth below each detection site and the location information of the plurality of detection sites.

9. The method of claim 1, wherein the target area is partitioned with grid lines to form the plurality of detection regions.

10. The method of claim 1, wherein the plurality of detection regions have a substantially same shape and a substantially same size.

11. The method of claim 1, wherein the plurality of detection sites are arranged in a two-dimensional array in the abnormal region.

12. The method of claim 11, wherein the plurality of detection sites are arranged in rows and columns in the abnormal region.

13. The method of claim 1, wherein the abnormal region is partitioned with grid lines to form a plurality of rectangular sub-regions having a substantially same size, each of the plurality of detection site is located at an intersection of two orthogonal grid lines.

14. The method of claim 1, wherein the step of acquiring location information of the plurality of detection sites comprises:

selecting one detection site from the plurality of detection sites as a reference site;

acquiring a reference geographic coordinate of the reference site; and acquiring geographic coordinates of other detection sites according to the reference geographic coordinate and the arrangement of the plurality of detection sites in the abnormal region.

* * * * *